(12) United States Patent
Geant et al.

(10) Patent No.: US 12,186,717 B2
(45) Date of Patent: Jan. 7, 2025

(54) MIXER, MIXER ASSEMBLY AND MIXING METHOD

(71) Applicant: Faurecia Emission Control Technologies (Shanghai) Co., Ltd, Shanghai (CN)

(72) Inventors: Ludovic Geant, Shanghai (CN); Jian Gao, Shanghai (CN); Thibault Fouquet, Shanghai (CN)

(73) Assignee: Cummins Emission Solutions Inc., Columbus, IN (US)

( * ) Notice: Subject to any disclaimer, the term of this patent is extended or adjusted under 35 U.S.C. 154(b) by 112 days.

(21) Appl. No.: 17/896,409

(22) Filed: Aug. 26, 2022

(65) Prior Publication Data
US 2023/0065989 A1   Mar. 2, 2023

(30) Foreign Application Priority Data
Aug. 26, 2021 (CN) .......................... 202110988458.2

(51) Int. Cl.
| | | |
|---|---|---|
| *B01F 25/10* | (2022.01) | |
| *B01F 23/213* | (2022.01) | |
| *B01F 25/313* | (2022.01) | |
| *F01N 3/20* | (2006.01) | |
| *F01N 3/28* | (2006.01) | |

(52) U.S. Cl.
CPC ........ *B01F 25/103* (2022.01); *B01F 23/2132* (2022.01); *B01F 25/3131* (2022.01); *B01F 25/3133* (2022.01); *F01N 3/2066* (2013.01); *F01N 3/2892* (2013.01); *F01N 2610/1453* (2013.01)

(58) Field of Classification Search
CPC .......................... B01F 25/103; B01F 23/2132; B01F 25/3131; B01F 25/3133; B01F 2025/931; B01F 25/313; F01N 3/2066; F01N 3/2892; F01N 2610/1453; F01N 2240/20; F01N 2610/00; Y02T 10/12
See application file for complete search history.

(56) References Cited

U.S. PATENT DOCUMENTS

| | | | | |
|---|---|---|---|---|
| 7,712,305 B2 * | 5/2010 | Kapsos | ................. | F01N 3/2882 |
| | | | | 60/303 |
| 8,438,839 B2 * | 5/2013 | Floyd | ................. | B01F 23/2132 |
| | | | | 239/132.3 |
| 8,756,921 B2 * | 6/2014 | Troxler | ................. | F01N 3/2066 |
| | | | | 60/274 |
| 9,062,589 B2 * | 6/2015 | Katou | .................... | F01N 3/035 |
| 9,435,240 B2 * | 9/2016 | Sampath | .......... | B01F 25/43151 |

(Continued)

FOREIGN PATENT DOCUMENTS

WO    WO-2018017164 A1 *  1/2018  .......... B01F 23/2132

*Primary Examiner* — Jesse S Bogue
(74) *Attorney, Agent, or Firm* — Foley & Lardner LLP

(57) ABSTRACT

A mixer, a mixer assembly and a mixing method in which the mixer comprises a shell defining a first space, the first space receives engine exhaust, and the shell has a mounting area located on a wall of the shell; a doser mounting base arranged in the mounting area for mounting the doser, wherein the doser mounting base comprises a spray inlet as an inlet end for the spray that is sprayed by the doser entering the first space, and the doser mounting base further comprises a first swirl structure that surrounds the spray inlet to make the exhaust form a swirl around the spray inlet.

13 Claims, 8 Drawing Sheets

(56) References Cited

U.S. PATENT DOCUMENTS

| | | | |
|---|---|---|---|
| 10,047,657 B2* | 8/2018 | Noren, IV | B01F 25/3131 |
| 10,174,658 B2* | 1/2019 | Dimpelfeld | F01N 3/2066 |
| 10,208,645 B2* | 2/2019 | Gehrlein | F01N 3/2892 |
| 10,369,533 B2* | 8/2019 | Whitten | B01F 23/20 |
| 10,920,635 B2* | 2/2021 | Kozakiewicz | B01F 25/10 |
| 11,459,929 B2* | 10/2022 | Dimpelfeld | B01F 25/10 |
| 11,624,310 B2* | 4/2023 | Cvelbar | F01N 13/082 |
| | | | 60/324 |
| 11,767,783 B2* | 9/2023 | De Rudder | B01F 23/2132 |
| | | | 60/282 |
| 2010/0212292 A1* | 8/2010 | Rusch | F01N 3/2892 |
| | | | 60/274 |
| 2013/0164181 A1* | 6/2013 | Iijima | F01N 13/009 |
| | | | 261/74 |
| 2018/0142597 A1* | 5/2018 | Riepshoff | F01N 3/2066 |
| 2020/0340379 A1* | 10/2020 | Kozakiewicz | B01F 25/3131 |
| 2021/0285355 A1* | 9/2021 | Dimpelfeld | F01N 3/2066 |
| 2021/0301710 A1* | 9/2021 | Cvelbar | F01N 13/1872 |

* cited by examiner

MIXER, MIXER ASSEMBLY AND MIXING METHOD

CROSS-REFERENCE TO RELATED APPLICATIONS

This application claims priority to Chinese Application No. 202110988458.2 filed Aug. 26, 2021, the disclosure of which is incorporated herein by reference in its entirety and for all purposes.

TECHNICAL FIELD

The present invention relates to a technical field of engine exhaust treatment, in particular to a mixer, an exhaust system and a mixing method.

BACKGROUND

Engine exhaust system processes the hot exhaust generated by the engine through various upstream exhaust components to reduce emissions. Various upstream exhaust components may comprise one or more of the following components: pipes, filters, valves, catalytic converters, silencers, etc. For example, the upstream exhaust treatment component directs the exhaust to a selective catalytic reduction (SCR) catalyst with inlet and outlet. The outlet leads the exhaust to downstream exhaust components. The mixer is positioned upstream of the inlet of the SCR catalyst. In the mixer, the exhaust generates swirling motion or rotary motion. The doser is used to spray reductant such as a urea aqueous solution into the exhaust stream from the upstream of SCR catalyst, so that the mixer can fully mix the urea and the exhaust, and discharge them to the SCR catalyst for reduction reaction to generate nitrogen and water, so as to reduce nitrogen oxide emissions of the engine. The doser can be fixedly installed through the mounting base of the mixer to spray urea aqueous solution into the mixer.

In the mixer, the urea spray sprayed from the doser needs to be fully decomposed and evenly mixed with exhaust to avoid urea crystallization.

However, there are still some improvements in the mixer based on existing technology, especially the need to reduce urea crystallization.

SUMMARY

The object of the present invention is to provide a mixer.

Another object of the present invention is to provide a mixer assembly.

Another object of the present invention is to provide a mixing method.

According to one aspect of the present invention, the mixer is used for an engine exhaust system. The mixer comprises: a shell defining a first space, wherein the first space receives engine exhaust, and the shell has a mounting area located on a wall of the shell; a doser mounting base arranged in the mounting area for mounting the doser, wherein the doser mounting base comprises a spray inlet as an inlet end of the first space for the spray that is sprayed by the doser entering the first space, and the doser mounting base further comprises a first swirl structure that surrounds the spray inlet to make the exhaust forms a swirl around the spray inlet.

In one or more embodiments of the mixer, the doser mounting base comprises a mounting plate for mounting in the mounting area, the mounting plate is provided with a spray inlet, the doser mounting base further comprises a swirl base, the swirl base is fixed to the mounting plate, the swirl base is provided with a spiral flow passage, and the spiral flow passage surrounds the spray inlet, the spiral flow passage forms the first swirl structure.

In one or more embodiments of the mixer, an edge of the swirl base has a notch, and the spiral flow passage extends from the notch to an end of the spiral flow passage, and is tangent to a profile line of the spray inlet.

In one or more embodiments of the mixer, the doser mounting base comprises a mounting plate for mounting in the mounting area, the mounting plate is provided with a spray inlet, the doser mounting base further comprises a swirl blade component, the swirl blade component is arranged around the spray inlet, and the swirl blade component constitutes the first swirl structure.

In one or more embodiments of the mixer, the doser mounting base comprises a mounting plate for mounting in the mounting area, the mounting plate is provided with a spray inlet, the doser mounting base further comprises a swirl base, the swirl base is fixed to the mounting plate, the swirl base is provided with a spiral flow passage, and the spiral flow passage surrounds the spray inlet, the doser mounting base further comprises a swirl blade component, swirl blades of the swirl blade component are distributed on an inner side of the spiral flow passage, and the spiral flow passage and the swirl blade component constitute the first swirl structure.

In one or more embodiments of the mixer, the swirl base is welded and fixed to the mounting plate, or the swirl base and the mounting plate are integrated.

In one or more embodiments of the mixer, the shell comprises a swirl cone, a small end of the swirl cone is provided corresponding to the spray inlet, a side wall of the swirl cone has an air inlet opening, and the air inlet opening is provided with a second swirl structure.

In one or more embodiments of the mixer, the side wall of the swirl cone has a plurality of air inlet openings distributed along a circumferential direction, and the second swirl structure comprises at least one swirl blade component provided with the air inlet openings.

A mixer assembly according to another aspect of the present invention comprises a doser and the mixer described in any one of the above items. The doser is installed on the doser mounting base, and a spray end of the doser is located at the spray inlet, therefore the spray of reductant solution sprayed by the doser is released into the mixer from the spray inlet.

In one or more embodiments of the mixer assembly, the reductant solution is a urea solution.

A mixing method according to another aspect of the present invention, which is used for mixing exhaust and spray of reductant solution, comprising: making spray of a reductant solution enter a mixing chamber from a spray inlet of the mixing chamber; making at least a part of the exhaust forms swirling exhaust at the spray inlet, and mixing the swirling exhaust with the spray at the spray inlet.

The progressive effects of the present invention include but are not limited to: by providing the first swirl structure around the spray inlet, the spray of the doser is fully mixed with the swirling exhaust immediately after entering the mixer, so that the spray is fully decomposed to reduce urea crystallization, improve the mixing effect of the mixer, and prolong the service life of the mixer assembly and the exhaust system.

BRIEF DESCRIPTION OF THE DRAWINGS

The above and other features, properties and advantages of the present invention will become more apparent through the following description in combination with the attached drawings and embodiments. In the attached drawings, the same reference numerals always represent the same features, wherein.

REFERENCE SIGNS

Figure 1:
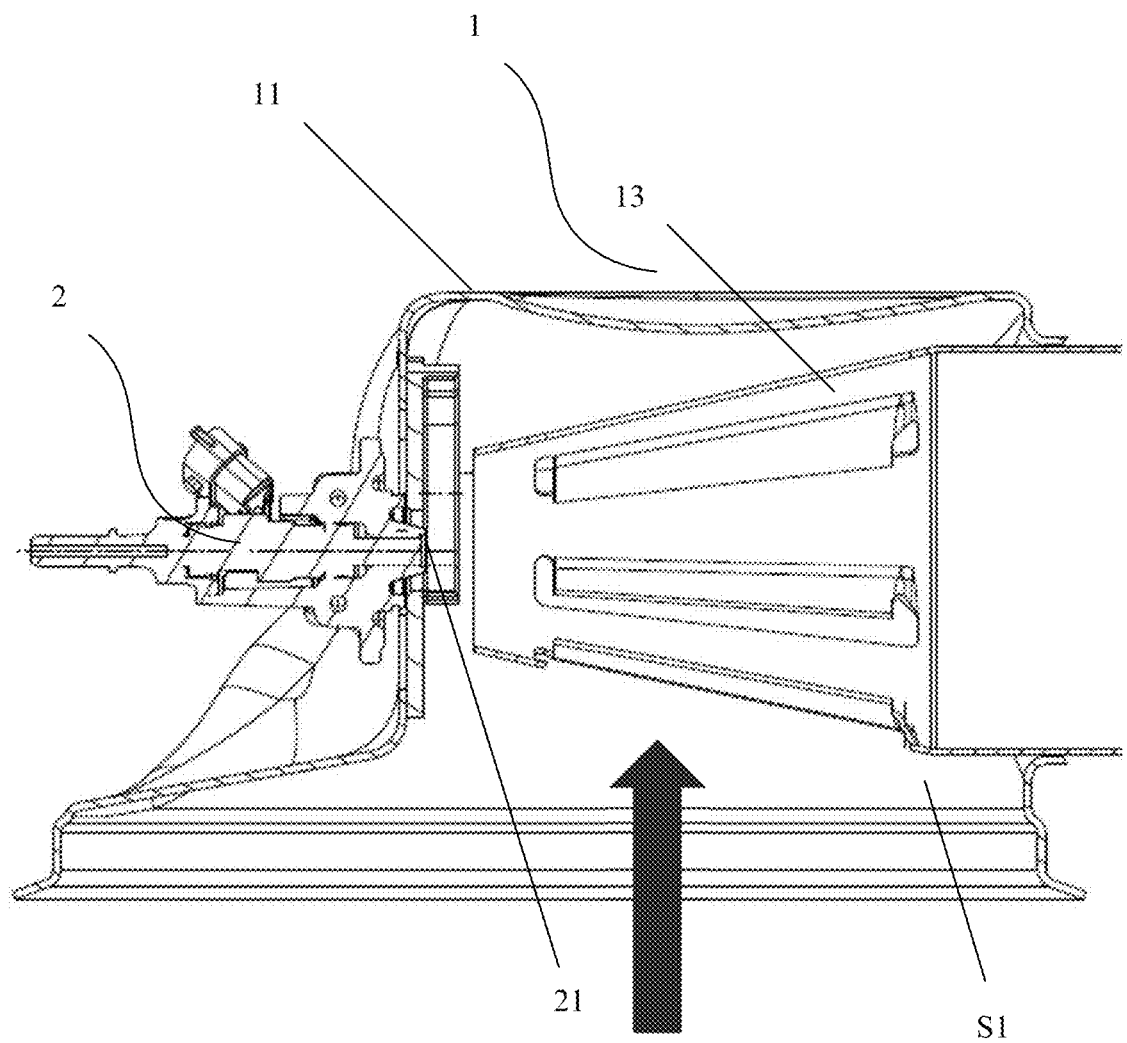
FIG. 1 is a structural diagram of a mixer assembly according to an embodiment.

10 mixer assembly
1—mixer
11 shell
111 installation area
S1 first space
12 doser mounting base
120 first swirl structure
121 spray inlet
122 mounting plate
123 swirl base
1230 notch
124 spiral flow passage,
125 profile line coincident area
126 swirl blade component
13 swirl cone
131 air inlet opening
132 second swirl structure
133 swirl blade component
2 doser
21 spray end

DETAILED DESCRIPTION OF EMBODIMENTS

The following discloses a variety of different implementation manners or embodiments for implementing the described subject technical proposal. In order to simplify the disclosure, specific examples of the elements and arrangements are described below. Of course, these are only examples, not limiting the scope of protection of the present invention.

In addition, for example, "one embodiment", "an embodiment", and/or "some embodiments" refer to a feature, structure or characteristic related to at least one embodiment of the present application. Therefore, it should be emphasized and noted that "an embodiment" or "one embodiment" or "one or more embodiments" mentioned twice or more in different positions in this specification do not necessarily refer to the same embodiment. In addition, certain features, structures or characteristics in one or more embodiments of the present application may be appropriately combined.

Figure 2:
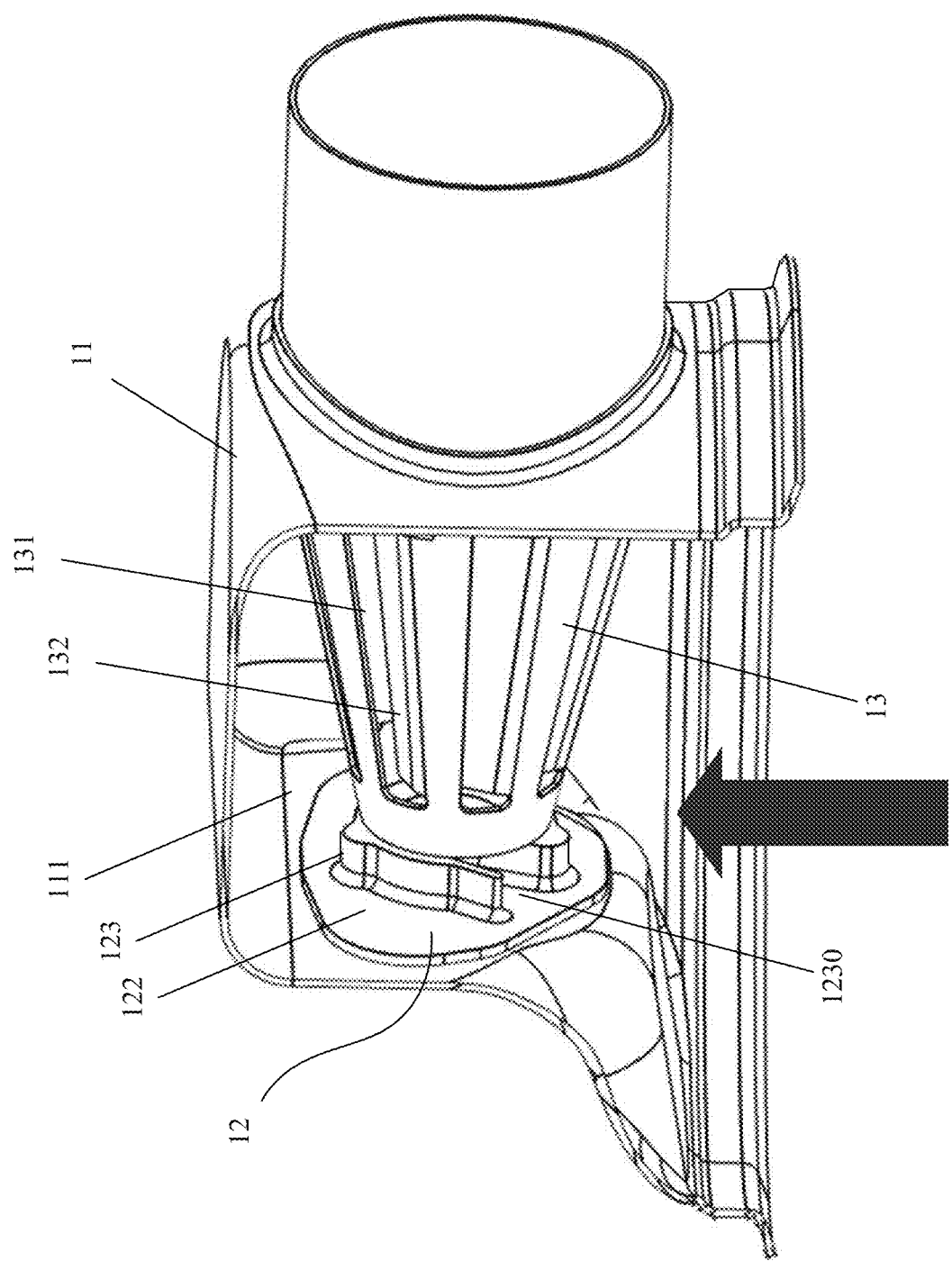
FIG. 2 is a partial structural diagram of a mixer according to an embodiment.

As shown in FIGS. 1 to 6, in some embodiments, the mixer assembly 10 may comprise a mixer 1 and a doser 2. The mixer 1 comprises a shell 11, which defines a first space S1. The first space S1 receives engine exhaust. The shell 11 has a mounting area 111 formed on a wall of the shell 11. The doser 2 is installed in the mounting area 111 to be installed to the mixer 1 to form the mixer assembly 10. As shown in FIGS. 1 and 2, the exhaust generated by engine operation may enter the first space S1 from below the shell 11.

The mixer 1 also comprises a doser mounting base 12, which is arranged in the mounting area 111 for installing the doser 2. Wherein, the doser mounting base 12 comprises a spray inlet 121, as an inlet end for the spray that is sprayed by the doser 2 entering the first space S1. As shown in FIG. 1, the spray end 21 of the doser 2 is located at the spray inlet 121, so that the spray of the reductant solution sprayed by the doser 2 is released into the mixer 1 from the spray inlet 121.

Figure 3:
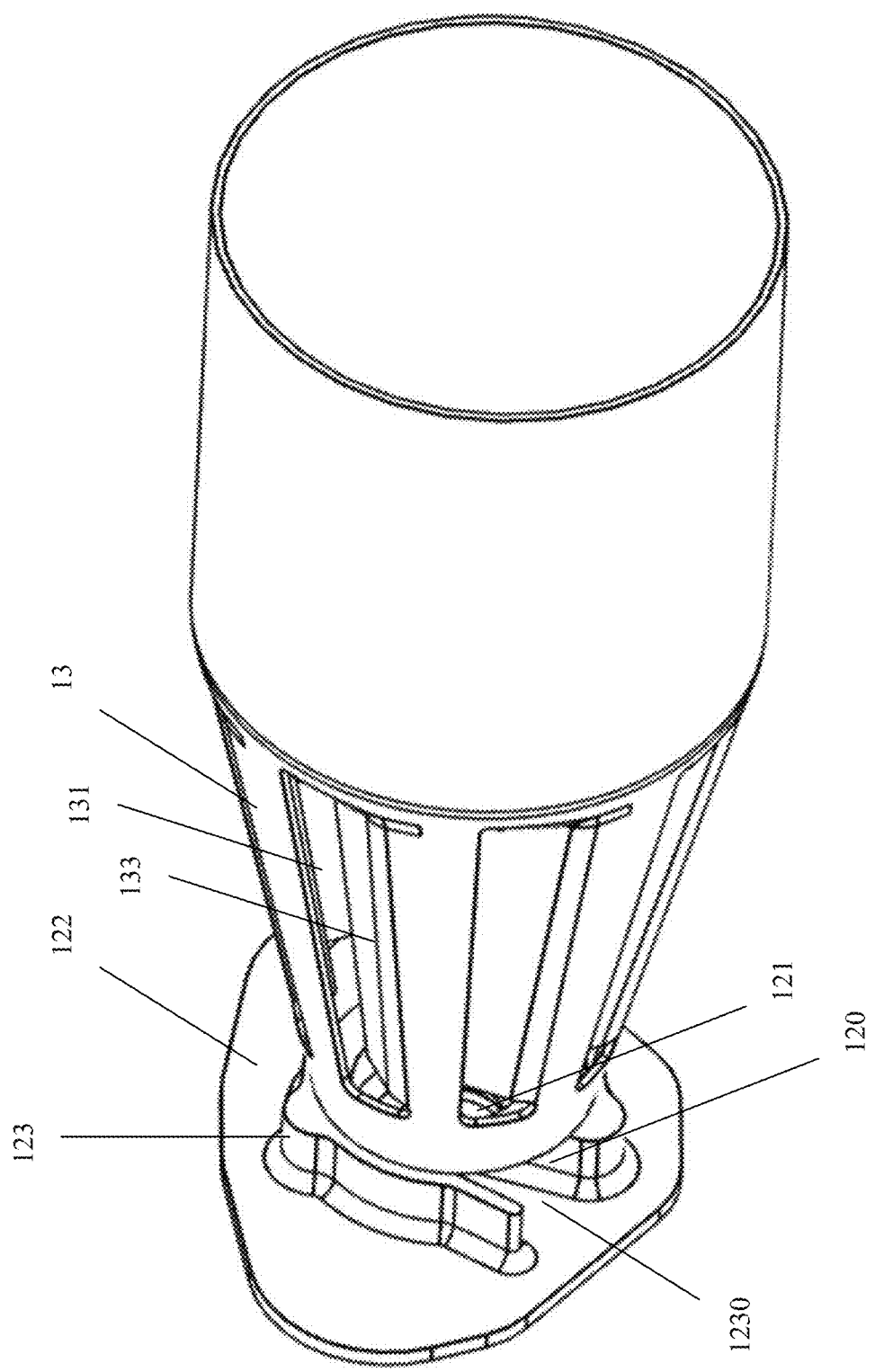
FIG. 3 is a partial structural diagram of a mixer according to an embodiment.
Figure 4:
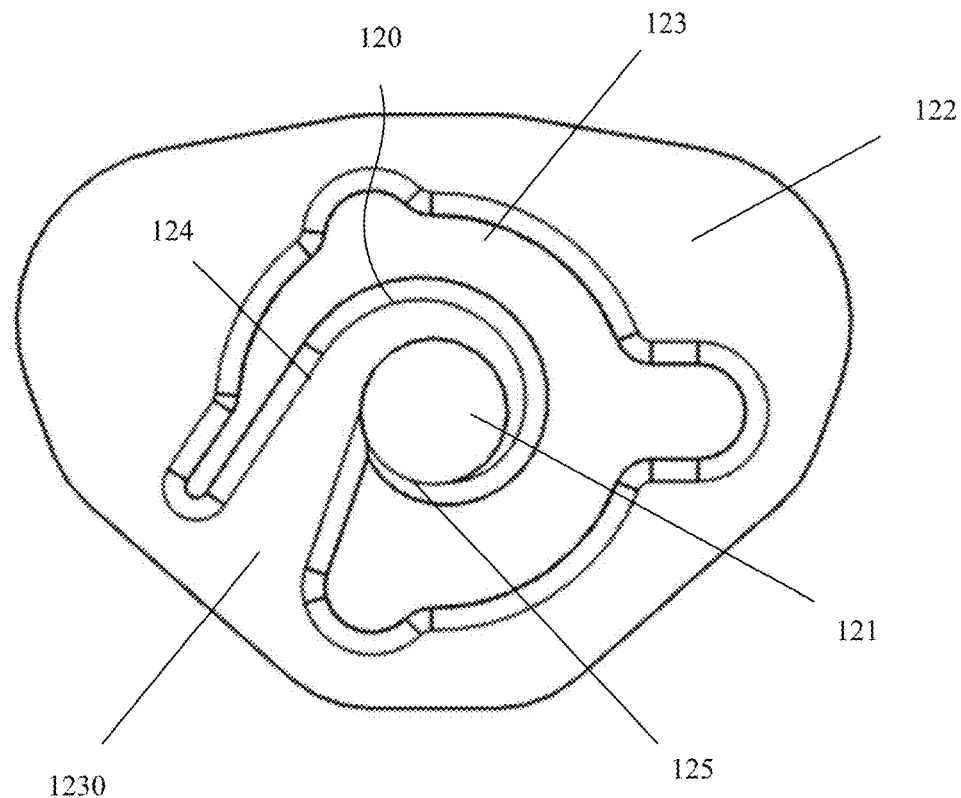
FIG. 4 is a structural diagram of a doser mounting base of a mixer according to an embodiment.
Figure 5:
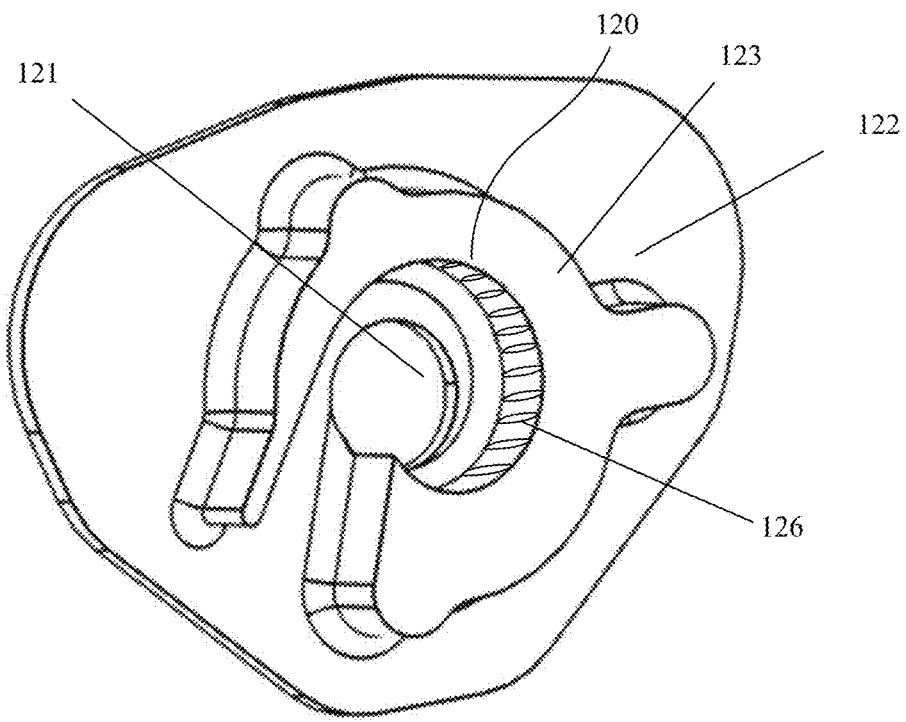
FIG. 5 is a structural diagram of a doser mounting base of a mixer according to another embodiment.
Figure 6:
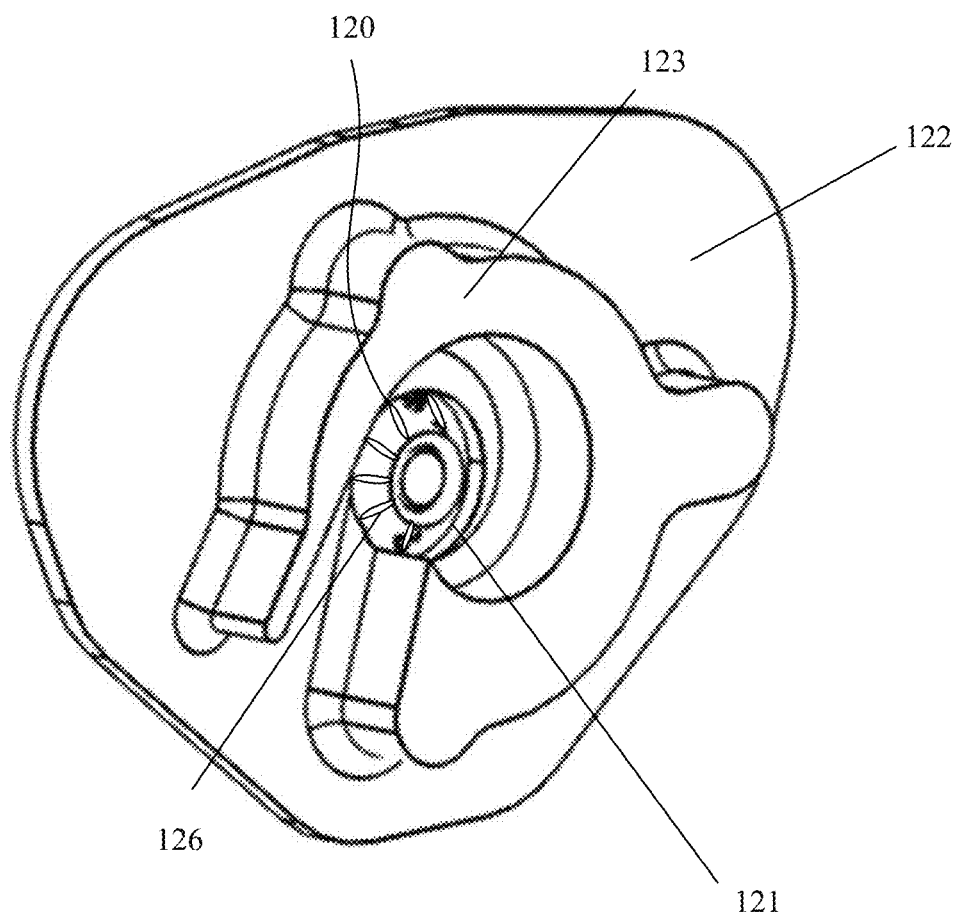
FIG. 6 is the structural diagram of a doser mounting base of a mixer according to another embodiment.
Figure 7:
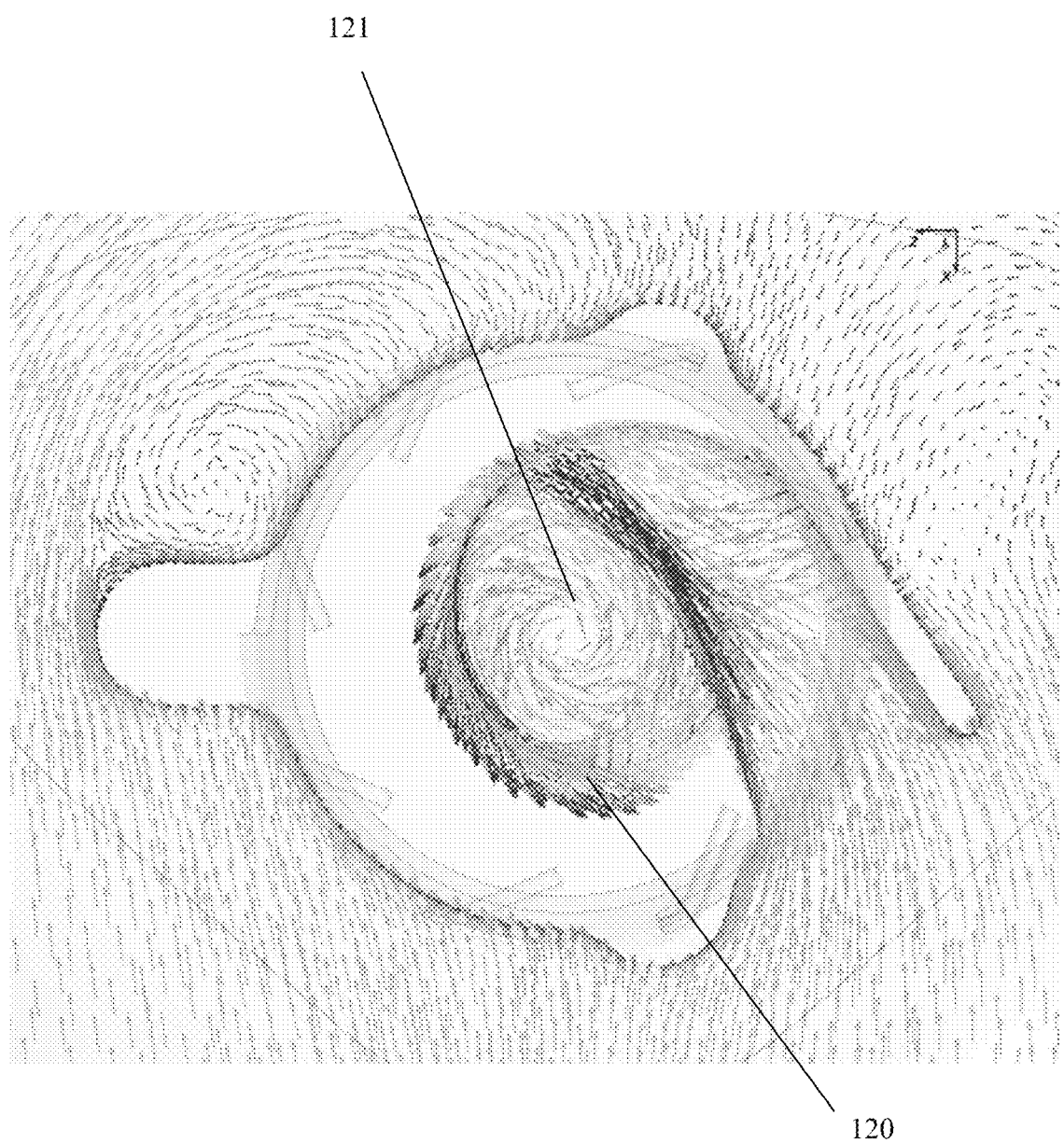
FIG. 7 is a schematic diagram of fluid simulation results of a doser mounting base of a mixer according to an embodiment.
Figure 8:
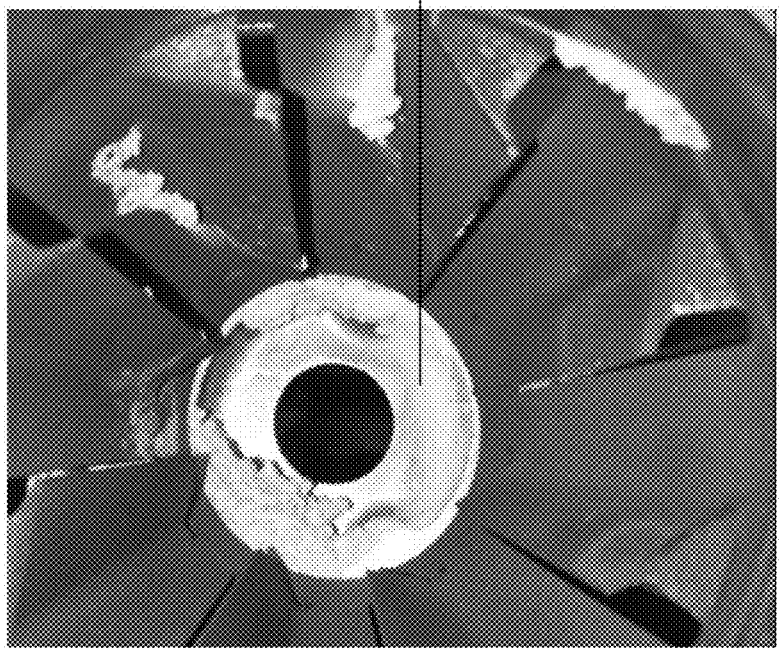
FIG. 8 is a schematic diagram of urea crystallization in a mixer of a comparative proposal.
Figure 9:
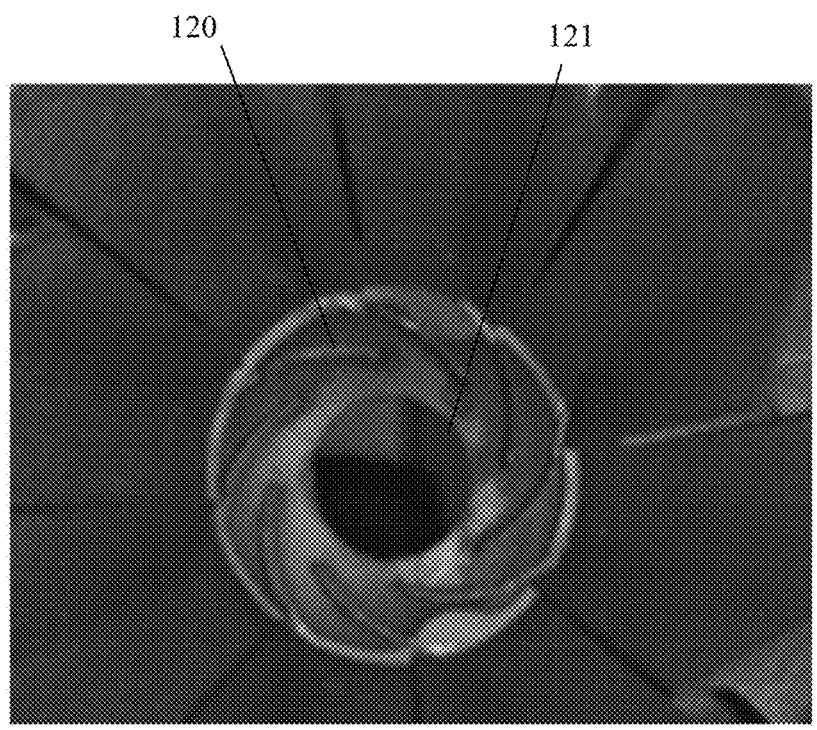
FIG. 9 is a schematic diagram of urea crystallization of a mixer according to an embodiment.

As shown in FIGS. 2 to 7, the doser mounting base 12 also comprises a first swirl structure 120 surrounding the spray inlet 121 to the exhaust form a swirl around the spray inlet 121, so that the spray that is sprayed by the doser 2 is fully contacted and mixed with the hot swirl exhaust immediately after entering the mixer from the spray inlet 121. Therefore, the spray is fully decomposed from the beginning of the diffusion process inside the mixer 1, or the position of the spray inlet 121 may be easy to gather droplets or liquid films to form urea, and swirling flow of the spray inlet 121 can purge and decompose it in time to reduce urea crystallization. Moreover, because the first swirl flow structure 120 is located nearby the spray inlet, as shown in FIGS. 4 to 6 for example, it is roughly tangent to the profile line of the spray inlet 121, so that the airflow movement at the spray inlet 121 is a swirling movement, and the negative impact on the spray is very small, to make the spray be fully extended and diffused in the mixer along the given spray direction, ensuring sufficient mixing distance between the spray and the exhaust. Therefore, the urea can be fully decomposed, and fully and evenly mixed with the exhaust. The principle that urea crystallization can be reduced by adopting the above embodiment is that the inventor accidentally found in practice that, as shown in FIG. 8, mixer 1 will have more urea crystals 3 around the spray inlet 121. After adopting the first swirl structure, as shown in FIG. 9, the urea crystals at the spray inlet 121 are almost eliminated, greatly improving the urea crystallization phenomenon inside mixer 1, and making the mixer meet the requirements. The simulation results shown in FIG. 7 show that the swirling effect near the spray inlet 121 is very strong.

As shown in FIG. 3 and FIG. 4, in an embodiment, the specific structure of the first swirl structure 120 and the doser mounting base 12 can be that the doser mounting base 12 comprises a mounting plate 122 for mounting in the mounting area 111, the mounting plate 122 is provided with a spray inlet 121, the doser mounting base 12 also comprises a swirl base 123, and the swirl base 123 is fixed to the mounting plate 122. The swirl base 123 is provided with a spiral flow passage 124, which surrounds the spray inlet 121 and forms a first swirl structure 120. As shown in FIG. 4, the streamline of the spiral flow passage 124 is a spiral.

In an embodiment, as shown in FIG. 4, the specific structure of the spiral flow passage 124 can be that the edge of the swirl base 123 has a notch 1230, and the spiral flow passage 124 extends from the notch 1230 to the end of the spiral flow passage 124 and is tangent to the profile line of the spray inlet 121, which can make the swirl effect around the spray inlet 121 better. The tangential structure is not limited to that shown in the figure. The profile line of the spiral flow passage 124 coincides with the profile line of the spray inlet 121 to form the profile coincident area 125, which is tangent at the end of the profile coincident area 125. Otherwise, it can be tangent to the profile line of the spray inlet 121 only at the end of the spiral flow passage 124, and the rest is not coincident. It can be understood that the tangency here refers to roughly tangency rather than strictly tangency. The beneficial effect of the first swirl structure 120 as the spiral flow passage 124 is that the spiral flow passage 124 naturally forms a swirling motion, which flows smoothly and has a high flow efficiency of the exhaust flow, and the gas flow does not need additional loss of work to convert into other forms of energy.

In another embodiment, as shown in FIG. 5, compared with the embodiment shown in FIG. 4, the first swirl structure 120 comprises swirl blade component 126 in addition to the spiral flow passage 124. The swirl blade component 126 can be located on the inner side of the spiral flow passage 124, for example, installed on the inner wall of the spiral flow passage 124 as shown in FIG. 5. At this time, the first swirl structure 120 comprises the spiral flow passage 124 and a swirl blade component 126. That is, the combined action of the spiral streamline and the swirl blade component form swirling exhaust around the spray inlet 121. In this way, the exhaust of the first swirl structure 120 can be strengthened, which is suitable for engines with large displacement. Because larger displacement engines need more urea solution spray, stronger swirl can more effectively prevent urea crystallization.

In another embodiment, the first swirl structure may also comprise a swirl blade component without a spiral flow passage. The specific position of the swirl blade component 126 can be directly arranged at the spray inlet 121 as shown in FIG. 6, or it can be arranged on the inner wall of the swirl base 123 around the spray inlet 121 similar to FIG. 5. In the structures shown in FIG. 5 and FIG. 6, the first swirl structure 120 comprises both the spiral flow passage 124 and the swirl blade component 126. It can be understood that in this another embodiment, the first swirl structure 120 does not comprise the spiral flow passage 124, that is, the swirl base 123 is removed from the structure in FIG. 6, or the swirl base 123 does not have a spiral flow passage in the structure in FIG. 5. For example, the notch 1230 of the swirl base 123 is closed to form an annular swirl base 123, and the swirl blade component 126 is located on the inner ring wall of the annular swirl base 123. In this way, the effect of reducing urea crystallization can also be obtained.

As shown in FIGS. 3 to 6, the swirl base 123 and the mounting plate 122 can be fixedly connected by welding, and such a connection structure is stable and reliable. Otherwise, the swirl base 123 and the mounting plate 122 can be an integral component, for example, integrated by the casting process, 3D printing process, etc., which can also make the structure of the swirl base and the mounting base stable and reliable.

Continuing to refer to FIGS. 1 to 3, in some embodiments, the shell 11 of the mixer 1 is also provided with a swirl cone 13. The small end of the swirl cone 13 is arranged corresponding to the spray inlet 121. The side wall of the swirl cone 13 is provided with an air inlet opening 131. The air inlet opening 131 is provided with a second swirl structure 132. By arranging the structure of the swirl cone 13, the spray beam of the spray can fully extend and diffuse. Besides, by arranging the air inlet opening with the swirl structure on the side wall, sufficient swirl exhaust can be ensured to be fully mixed with urea spray, so that urea is fully decomposed and evenly mixed, and the direct impact on the spray beam can also be reduced. The specific structure of the second swirl structure 132 can be that the side wall of the swirl cone 13 has a plurality of air inlet openings 131 distributed in the circumferential direction, and the second swirl structure 132 comprises at least one swirl blade component 133 arranged at the air inlet opening 131. For example, each air inlet opening 131 shown in the figure of the embodiment should have a corresponding swirl blade component 133, but not limited to that. For example, not every but only a part of the air inlet openings 131 may have a corresponding structure such as a swirl blade component, which has a good swirl effect and is easy to process.

Figure 10:
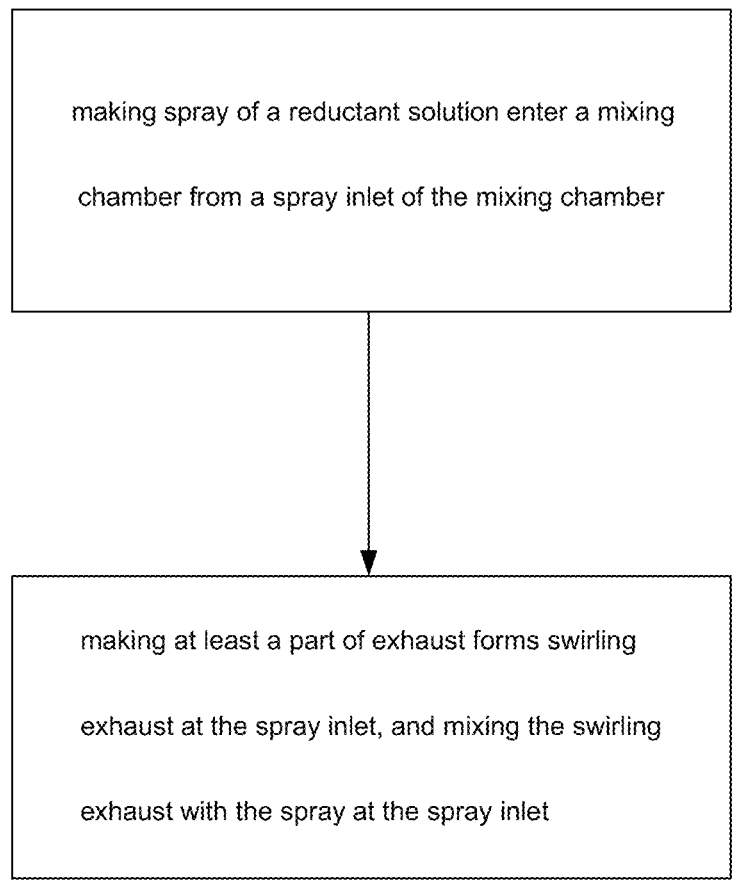
FIG. 10 is a flow chart of a mixing method according to an embodiment.

According to the above description, referring to FIG. 10, the mixing method of exhaust and urea spray described in the above embodiment comprises:

making the spray of reductant solution enters the mixing chamber from the spray inlet of the mixing chamber.

For example, as shown in FIG. 1, the spray of urea solution sprayed by the doser 2 enters the mixer 1 from the spray inlet 121 to mix with the exhaust.

At least part of the exhaust forms swirling exhaust at the spray inlet, and the swirling exhaust is mixed with the spray at the spray inlet.

As shown in FIGS. 2 to 7, part of the exhaust passes through the swirling structure 120, such as the spiral flow passage 124 and/or the swirl blade component 126, and forms a swirling flow at the spray inlet. The swirling flow is mixed with the spray of urea solution at the spray inlet 121 to reduce urea crystallization.

In the above embodiments, a flowchart is used to illustrate the steps of mixing exhaust and urea spray according to the structure of some embodiments of the application. It should be understood that the preceding or following operations are not necessarily performed accurately in sequence. Technicians can also add other operations to these procedures or remove one or more operations from these procedures.

It can be seen from the above that the beneficial effect of adopting the mixer, mixer assembly and mixing method described in the above embodiment is that by arranging the first swirling structure around the spray inlet, the spray of the doser is fully mixed with the swirling exhaust immediately after entering the mixer, so that the spray is fully decomposed to reduce urea crystallization and improve the mixing effect of the mixer, and the service life of the mixer assembly and the exhaust system thereof are prolonged.

Although the above embodiments of the disclosure are disclosed as above, they are not intended to define the present invention. Any person skilled in the art can make possible changes and modifications without departing from the spirit and scope of the present invention. Therefore, any amendments, equivalent changes and modifications made to the above embodiments according to the technical essence of the disclosure without departing from the technical proposals of the disclosure fall within the scope of protection defined in the claims of the present invention.

We claim:

1. A mixer for an engine exhaust system, the mixer comprising:

a shell defining a first space, wherein the first space is configured to receive engine exhaust and the shell has a mounting area located on a wall of the shell; and a doser mounting base, arranged in the mounting area for mounting a doser, the doser mounting base comprising:

a spray inlet, the spray inlet being an inlet end for a spray that is sprayed by the doser entering the first space, a first swirl structure that surrounds the spray inlet and is configured to make the exhaust form a swirl around the spray inlet, a mounting plate configured to be mounted in the mounting area, the mounting plate being provided with the spray inlet, and a swirl base fixed to the mounting plate, the swirl base provided with a spiral flow passage, the spiral flow passage continuously tapering and surrounding the spray inlet, and the spiral flow passage forming the first swirl structure, wherein an edge of the swirl base comprises a notch, and wherein the spiral flow passage extends from the notch to an end of the spiral flow passage and is tangent to a profile line of the spray inlet.

2. The mixer of claim 1, wherein the doser mounting base further comprises a swirl blade component, the swirl blade component being arranged around the spray inlet, and the swirl blade component constituting the first swirl structure.

3. The mixer of claim 1, wherein:

the doser mounting base further comprises a swirl blade component comprising swirl blades that are distributed on an inner side of the spiral flow passage; and the spiral flow passage and the swirl blade component constitute the first swirl structure.

4. The mixer of claim 1, wherein:

the swirl base is welded and fixed to the mounting plate; or the swirl base and the mounting plate are integrated.

5. The mixer of claim 1, wherein the shell comprises a swirl cone having a small end corresponding to the spray inlet, a side wall of the swirl cone comprising an air inlet opening, and the air inlet opening being provided with a second swirl structure.

6. The mixer of claim 5, wherein:

the side wall comprises a plurality of air inlet openings distributed along a circumferential direction; and the second swirl structure comprises at least one swirl blade provided with the air inlet opening.

7. A mixer assembly comprising:

a doser; and the mixer of claim 1;

wherein the doser is mounted on the doser mounting base, a spray end of the doser is located at the spray inlet, so that spray of a reductant solution sprayed by the doser is released into the mixer from the spray inlet.

8. The mixer assembly of claim 7, wherein the reductant solution is a urea solution.

9. The mixer assembly of claim 7, wherein the doser mounting base further comprises a swirl blade component, the swirl blade component being arranged around the spray inlet, and the swirl blade component constituting the first swirl structure.

10. The mixer assembly of claim 7, wherein the doser mounting base further comprises a swirl blade component comprising swirl blades that are distributed on an inner side of the spiral flow passage, the spiral flow passage and the swirl blade component constituting the first swirl structure.

11. The mixer assembly of claim 7, wherein the shell comprises a swirl cone having a small end corresponding to the spray inlet, a side wall of the swirl cone comprising an air inlet opening, and the air inlet opening being provided with a second swirl structure.

12. The mixer assembly of claim 7, wherein:

the first swirl structure comprises a swirl blade component with a plurality of swirl blades;

the shell comprises a swirl cone having a side wall with a plurality of air inlet openings distributed along a circumferential direction; and each of the swirl blades is contiguous with one of the air inlet openings.

13. A mixing method for mixing exhaust with spray of reductant solution using the mixer of claim 1, the mixing method comprising:

making a spray of a reductant solution entering the mixer from the spray inlet;

making at least a part of the exhaust form swirling exhaust at the spray inlet; and mixing the swirling exhaust with the spray at the spray inlet.

* * * * *